V. CRABB.
DYNAMO ELECTRIC GENERATOR.
APPLICATION FILED DEC. 10 1919.
1,401,883.
Patented Dec. 27, 1921.
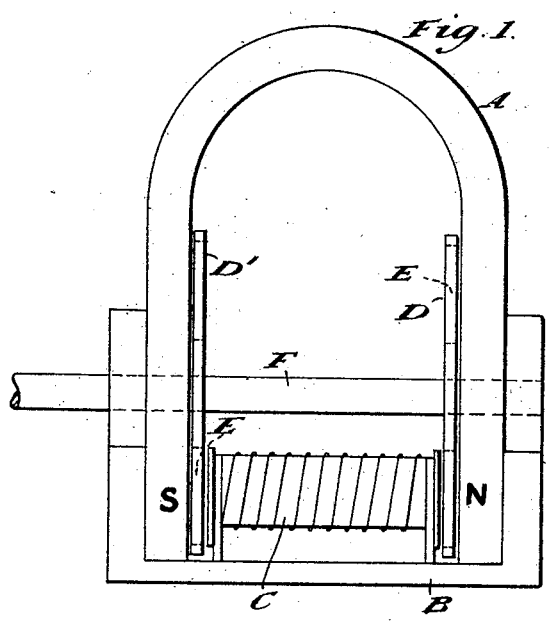
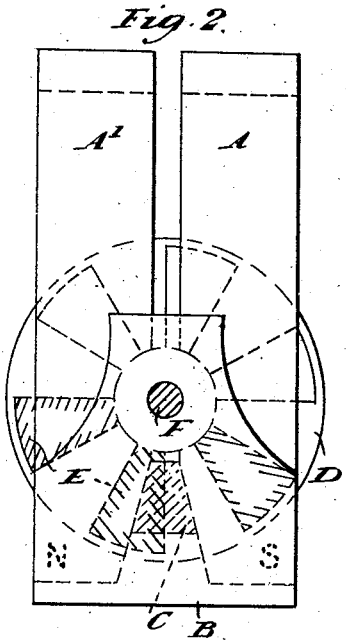
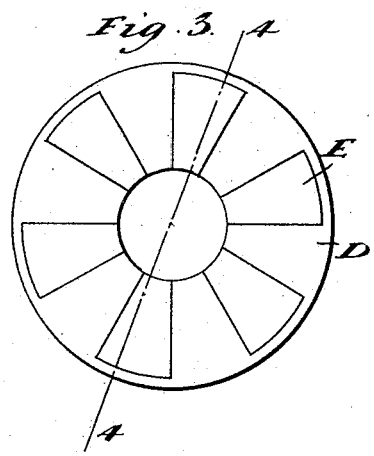
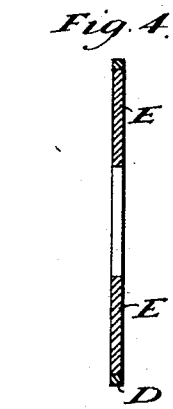
Witnesses:
Inventor
Victor Crabb
by
Attorney

UNITED STATES PATENT OFFICE.

VICTOR CRABB, OF LONDON, ENGLAND.

DYNAMO-ELECTRIC GENERATOR.

1,401,883.  Specification of Letters Patent.  Patented Dec. 27, 1921.

Application filed December 10, 1919. Serial No. 343,964.

*To all whom it may concern:*

Be it known that I, VICTOR CRABB, a subject of the King of Great Britain, residing in London, England, have invented certain new and useful Improvements in and Relating to Dynamo-Electric Generators, of which the following is a specification.

This invention relates to dynamo electric generators which, although primarily designed for supplying energy to electric ignition devices such as may be used for internal combustion engines, in which case a permanent magnet field would usually be employed, can also be applied to the generation of electric energy for other purposes, such as the supply of electric lighting and power circuits.

The essentially novel feature of the invention is the special arrangement of the parts which constitute the magnetic circuit of the generator and comprise two stationary field magnets or sets of field magnets arranged side by side in such manner that adjacent pole pieces are of opposite polarity, a stationary armature or core of magnetic material encircled by a coil or coils and centrally disposed between the pole pieces of the two magnets and separated therefrom by an air space at either end, and a rotating element comprising iron or steel segments each of which in rotation alternately closes the magnetic circuits of the two field magnets through the armature core. The particular disposition of the magnet poles, armature core and magnetic segments is such that each segment in turn produces a magnetic flux through the core first in one direction and then, after a sudden reversal, in the opposite direction as it passes from the field of one magnet system to that of the other magnet system.

The invention is illustrated in the accompanying drawings, wherein Figure 1 is a side elevation of one embodiment of the invention; Fig. 2 is an end elevation; Fig. 3 is an elevation of one construction of the rotating element of the magnetic circuit; and Fig. 4 is a section of the same on line 4—4 in Fig. 3.

Two magnets A, A' of horseshoe pattern are fixed on a non-magnetic base B with unlike poles N, S adjacent to each other.

Extending between the two pairs of poles with its axis in the central vertical plane between the magnets is a core or armature C around which is wound a coil or coils constituting the armature winding of the generator. The core C is fixed on the base B and a gap is left between each end of the core and the poles of the magnet of sufficient width to admit a disk or frame D or D' of non-magnetic material, into which are fitted a series of radially disposed sector-shaped plates E of iron or steel, the arrangement being such that when the disk or frame, which is mounted on a shaft F journaled in the frame B centrally between the two magnets from which it is magnetically insulated and parallel with the armature core, is rotated, the iron plates E in turn sweep the spaces between the ends of the armature core C and the poles of the magnets A, A' with just a bare clearance on either side of the plates.

The poles of the magnets A, A' may be formed or cut away as shown so as to form a gap between them of substantially the same shape and size as the iron segments E, and further the core C or its ends may be similarly shaped and dimensioned.

It will be seen that as the disk D is rotated, each plate E will, as it sweeps through the gaps between the poles of each magnet and the ends of the core C, close the magnetic circuits of the two magnets A, A' alternately through the armature core C, and the consequent alternating magnetic flux through the core with rapid reversal thereof due to the particular disposition of the elements of the magnetic circuit will generate an alternating E. M. F. in the core windings of high value in relation to the speed of rotation of the shaft.

Having thus described the nature of the said invention and the best means I know of carrying the same into practical effect, I claim:—

1. A dynamo-electric generator comprising a pair of stationary field magnets arranged side by side with the pole pieces of one magnet adjacent, respectively, the pole pieces of opposite polarity of the other magnet, a stationary armature core extending centrally between the pole pieces of said magnets, and a pair of disks carrying segments of magnetic material mounted to sweep the spaces between the magnet poles and the ends of the armature.

2. A dynamo-electric generator comprising a pair of stationary horse shoe magnets arranged side by side in spaced relation with unlike poles adjacent, a stationary armature core extending between the pole pieces of the two magnets and so dimensioned as to leave air gaps between the core and pole pieces and having its axis central of the space between said magnets, a shaft journaled centrally in said space between the two magnets parallel with the stationary armature core, and a series of inductors carried by said shaft and adapted to sweep the air gaps between the magnet poles and the armature core.

3. A dynamo-electric generator as claimed in claim 2, wherein the inductors and the pole pieces of the magnets are so shaped and dimensioned that the air space between adjacent poles of the two magnets is substantially bridged by each inductor as it sweeps past the central position.

4. A dynamo-electric generator as claimed in claim 2, wherein the ends of the armature core and the inductors have substantially the same width as the space between adjacent pole pieces of the two field magnets.

In testimony whereof I have signed my name to this specification.

VICTOR CRABB.